(12) United States Patent
Suumen

(10) Patent No.: US 6,555,034 B2
(45) Date of Patent: Apr. 29, 2003

(54) METHOD FOR CONTROLLING AN INJECTION MOLDING MACHINE CAPABLE OF REDUCING VARIATIONS IN WEIGHT OF MOLDED PRODUCTS

(75) Inventor: Hiroyoshi Suumen, Sakura (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 290 days.

(21) Appl. No.: 09/750,722

(22) Filed: Jan. 2, 2001

(65) Prior Publication Data

US 2001/0023996 A1 Sep. 27, 2001

(30) Foreign Application Priority Data

Mar. 27, 2000 (JP) .................................. 2000-085958
Apr. 5, 2000 (JP) .................................. 2000-103341

(51) Int. Cl.⁷ .............................................. B29C 45/76
(52) U.S. Cl. ..................... 264/40.1; 264/40.4; 425/140; 425/145; 425/148
(58) Field of Search .................. 264/40.1, 40.4; 425/140, 143, 148, 135, 145, 141

(56) References Cited

U.S. PATENT DOCUMENTS 4,326,255 A  *  4/1982  Fujita .......................... 700/203
5,075,050 A     12/1991  Nilsson
5,194,195 A  *  3/1993  Okushima .................. 264/40.1

FOREIGN PATENT DOCUMENTS

| EP | 0 513 774 A2 | 11/1992 |
| JP | 4-110119 | 4/1992 |
| JP | 9-254219 | 9/1997 |
| JP | 11-34133 | 2/1999 |

* cited by examiner

Primary Examiner—Jan H. Silbaugh
Assistant Examiner—Monica A Fontaine
(74) Attorney, Agent, or Firm—Squire, Sanders & Dempsey, L.L.P.

(57) ABSTRACT

A control method for an injection molding machine comprises the steps of measuring a density of a molten resin in a heating cylinder, controlling a stroke of an injection screw in an injection process by feed forward control based on the measuring step, and controlling an operating parameter of the injection molding machine based upon the measuring step.

9 Claims, 6 Drawing Sheets

METHOD FOR CONTROLLING AN INJECTION MOLDING MACHINE CAPABLE OF REDUCING VARIATIONS IN WEIGHT OF MOLDED PRODUCTS

BACKGROUND OF THE INVENTION

The present invention relates to a method for controlling an injection molding machine and, more specifically, a controlling method that is suitable to reduce variations in weight of molded products.

Referring now to FIG. 1, a motor-driven injection molding machine will now be described, centering on an injection unit included therein. The motor-driven injection molding machine comprises an injection unit driven by a servomotor. In such an injection unit, rotation of the servomotor is converted into a linear motion by a ball screw and a nut, thereby moving a screw forward and backward.

In FIG. 1, rotation of an injection servomotor 11 is transmitted to a ball screw 12. A nut 13 is fixed on a pressure plate 14 and moved forward and backward by rotation of the ball screw 12. The pressure plate 14 is movable along four guide bars 15, 16 (only two of them are shown in the figure) fixed on a base frame (not shown). Forward and backward motion of the pressure plate 14 is transmitted to a screw 20 via a bearing 17, a load cell 18, and an injection shaft 19. The screw 20 is rotatably and axially movably disposed in a heating cylinder 21. The heating cylinder 21 includes a hopper 22 for feeding a resin at the position corresponding to the rear portion of the screw 20. Rotation motion of a servomotor 24 for rotating the screw 20 is transmitted to the injection shaft 19 via connecting members 23 such as a belt or pulleys. In other words, the servomotor 24 rotates the injection shaft 19, which rotates the screw 20.

In a plasticizing/measuring process, the screw 20 rotates and moves backward in the heating cylinder 21, whereby a molten resin is stored in front of the screw 20, that is, in the heating cylinder 21 on the side of a nozzle 21-1. The backward movement of the screw 20 is effected by a pressure caused by the gradually increasing amount of a molten resin stored in front of the screw 20.

In a filling and injecting process, forward movement of the screw 20 is effected by driving force of the injection servomotor 11, whereby the molten resin stored in front of the screw 20 is filled and pressurized in a metal mold for molding. In this case, the force to press the molten resin is detected by the load cell 18 as an injection pressure. The detected injection pressure is amplified by a load cell amplifier 25 and fed into a controller 26. The pressure plate 14 is provided with a position detector 27 for detecting the amount of movement of the screw 20. The detected signal outputted from the position detector 27 is amplified by a position detector amplifier 28 and fed into the controller 26.

The controller 26 outputs current (torque) instruction values corresponding to the respective processes based on the set values preset by a display/setting unit 33 via a man-machine controller 34. A drive 29 controls current for driving the injection servomotor 11 to control output torque of the injection servomotor 11. A drive 30 controls current for driving the servomotor 24 to control the number of revolutions of the servomotor 24. The injection servomotor 11 and the servomotor 24 comprise encoders 31 and 32, respectively, for detecting the numbers of revolutions. The numbers of revolutions detected by the encoders 31 and 32 are fed to the controller 26. Especially, the number of revolutions detected by the encoder 32 is used to know the number of revolutions of the screw 20.

On the other hand, a plurality of heaters 40 are disposed around the heating cylinder 21 for heating and melting the resin fed from the hopper 22. These heaters 40 are controlled by a temperature controller 41. The temperature controller 41 receives the temperature detecting signals fed from a plurality of thermocouples 42 disposed in the vicinity of the heaters 40. The temperature controller 41 outputs the temperature detecting signals from the plurality of thermocouples 42 to the controller 26 as thermocouple-detected values. The temperature controller 41 also controls the plurality of heaters 40 based on the heater temperature-setting signals that represent the heater temperature setting values sent from the controller 26.

Actually, as shown in FIG. 2, multiple zones are defined around the heating cylinder 21, and the respective heaters are disposed in their respective zones around the heating cylinder 21 and independently controlled in terms of energization. Normally, multiple zones are defined in such a manner that a zone Z0 is allocated immediately below the hopper 22, and from there, zones Z1, Z2, Z3, Z4, and Z5 are allocated in sequence toward the nozzle 21-1.

In the injection molding machine, it is important to manufacture a large volume of products that are stable in quality in a short time at a low cost. Hereinafter, the description about the stable quality will be made limiting to the weight of the molded product. The controlling methods for obtaining a stable quality are as follows. The first method is a controlling method that can make correction for disturbances. In other words, feedback control maintains a characteristic that is considered to be an alternative to variations in weight of molded products in constant. The second method is a control method that aims at no-variation in weight by estimating variations in weight of the molded products in advance, and applying signals that cancels the estimated variations (feed forward control).

However, in the second controlling method, it is very difficult to ascertain the controlled object. Therefore, before using the second controlling method generally, many problems must be solved.

Referring now to the block diagram of FIG. 3, the outline of a mold internal pressure feed forward controlling method based on the second controlling method presented in the injection process will be described. In FIG. 3, Gc(S) represents a transfer function in the controller for controlling the injection servomotor 11 described in conjunction with FIG. 1, and Gp(S) represents a transfer function of the process. G1p(S) represents a transfer function for converting a disturbance such as variations in temperature of the heating cylinder 21 into variations in density of the molten resin. It is because variations in density of the molten resin effect on the mold internal pressure, and consequently, the weight of the molded product may vary. The disturbance is caused by various factors, for example, by variations in temperature of the heating cylinder 21, or by the state of the molten resin such as the temperature or the pressure, and the number of revolutions of the screw. In any cases, respective sensors that correspond to the respective types of the disturbance may detect such disturbances, and the detected results are fed to a subtracter 51. Assuming that the signal between the transfer function Gc(S) in the controller and the transfer function Gp(S) of the process is a value detected by the load cell described in conjunction with FIG. 1, Gc (S)=value detected at the load cell (S)/disturbance (S), Gp (S)=mold internal pressure/value detected at the load cell (S), are satisfied.

On the other hand, the transfer function G1p(S) is used for generating signals for canceling variations in amount of control caused by disturbances (in this case, the mold internal pressure that may effect on the weight of the molded product). Assuming that the amount of change in the mold internal pressure caused by the disturbance is Δp (t), the transfer function G1p(S) is used for generating the signal corresponding to −Δp(t).

As described above, in the current feed forward controlling method, variations in weight of the molded product is intended to be eliminated by maintaining the mold internal pressure at a intended value by detecting the disturbances that have been converted into variations in density of the molten resin and applying operational signals that can cancel detected variations in density of molten resin to the control system. The operational signals described here mean, specifically, signals of which the real stroke of the screw in the injection process is considered to be the amount of operation.

However, it is not easy to convert variations in density of the molten resin into the real stroke of the screw. Even for the identical variations in density of the molten resin, when changes occurred in the temperature of the resin or the amount of cushion at the time of injecting motion, the transfer function G1p (S) must be changed. This is difficulty of the feed forward control.

Difficulty of feed forward control will now be described from the different point of view. The primary cause of variations in density of the molten resin consists in variations in size of a resin material (variations in size of the pellet or ground material). In the actual molding operation, a method for stabilizing the molten resin density employed here uses the technique of changing the set temperatures for the zones Z1 and Z2 of the heating cylinder 21 shown in FIG. 2. More specifically, the set values of temperature for the zones Z1 and Z2 of the heating cylinder 21 are increased in the molding operation in which melting of a resin takes longer time than usual due to the reasons such that the size of a resin material is large, the molding cycle is short, or the measuring stroke is large. The reason is that melting temperature of a resin is not affected largely by a small change of the set values of temperature for the zones Z1 and Z2. Changing the number of revolution of the screw or the backing pressure of the screw may be contemplated as an alternative method, but this method cannot be employed easily due to its significant effect on the temperature of resin.

SUMMARY OF THE INVENTION

Accordingly, it is an object of the present invention to overcome the problems found in the feed forward control, and to provide a method for controlling an injection molding machine that can reduce variations in weight of the molded products.

It is another object of the present invention to stabilize the density of the molten resin and to reduce variations in weight of the molded product by adding an auxiliary feedback control system that considers the temperature of a heating cylinder as the amount of the operation.

The present invention is a method for controlling an injection molding machine. The method according to a first aspect of the present invention comprises the steps of measuring a density of a molten resin in a heating cylinder, controlling a stroke of an injection screw in an injection process by feed forward control based on the measuring step, and controlling an operating parameter of the injection molding machine based upon the measuring step.

The method according to a second aspect of the present invention comprises the steps of measuring a density of molten resin in a heating cylinder, determining a state of a temperature of the heating cylinder based upon a predetermined algorithm, and controlling a temperature of the heating cylinder based upon the measuring step and the determined state of the temperature, thereby minimizing variations in density of the molten resin.

DESCRIPTION OF THE PREFERRED EMBODIMENTS

Figure 3:
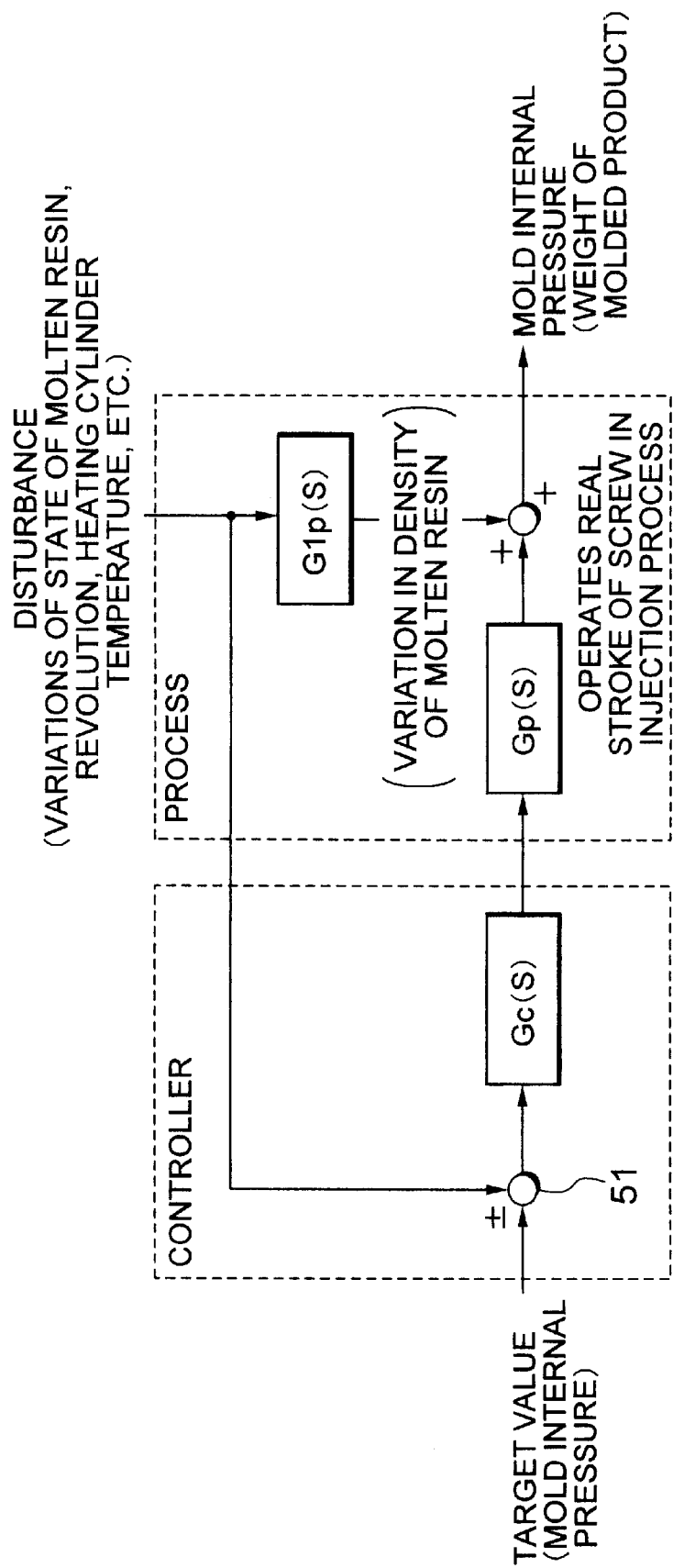
FIG. 3 is a block diagram showing a conventional mold internal pressure feed forward control system.
Figure 4:
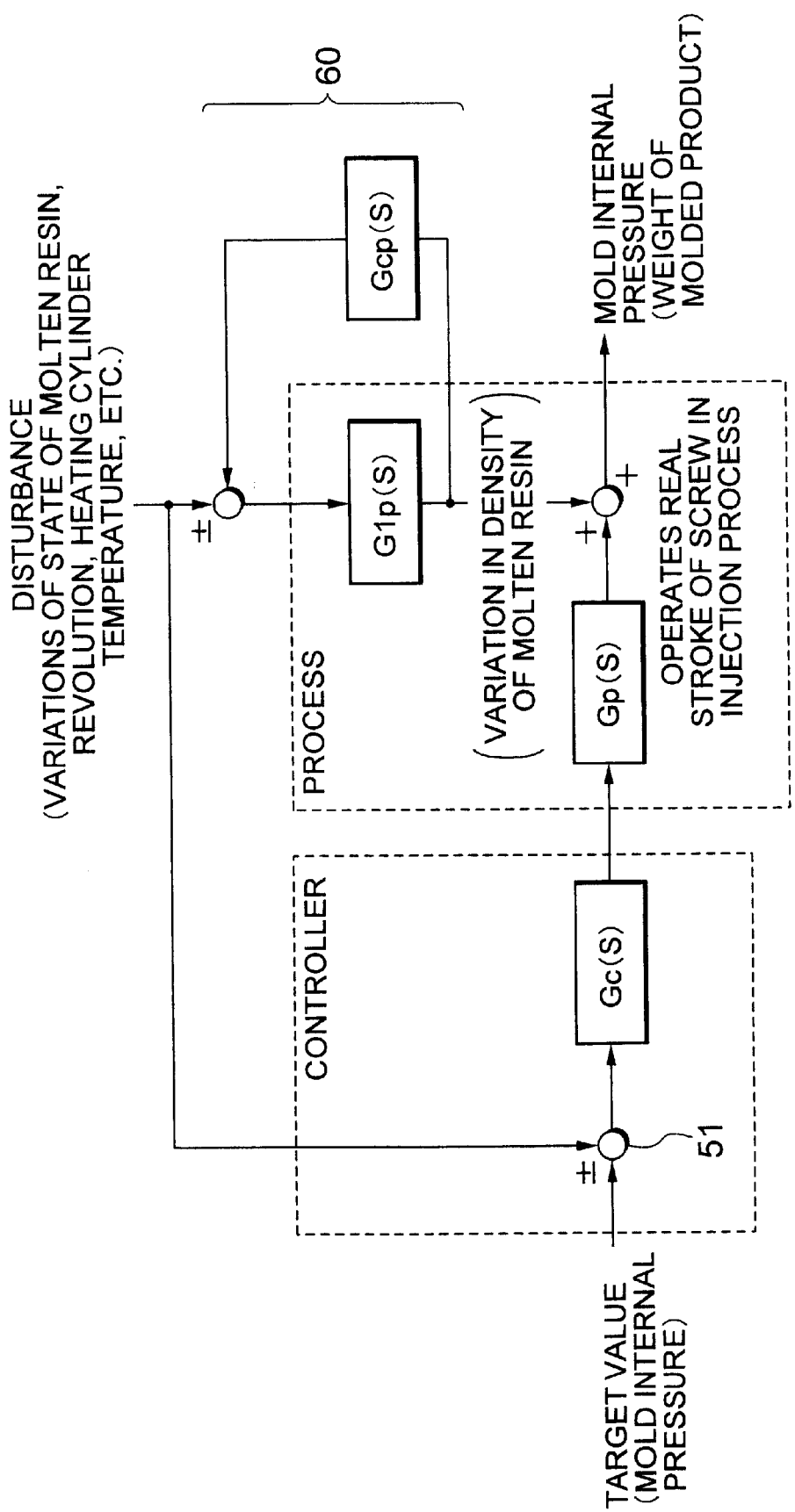
FIG. 4 is a block diagram showing a mold internal pressure feed forward control system according to a first embodiment of the present invention.

Referring now to FIG. 4, a mold internal pressure feed forward controlling method according to a first embodiment of the present invention will now be described. FIG. 4 is a block diagram of the mold internal pressure feed forward control system according to the present invention. In the present invention, as show in FIG. 4, a feedback control system 60 is added to the feed forward control system described in conjunction with FIG. 3.

The feedback control system 60 is used for performing feedback of variations in density of the molten resin measured by a measuring device for measuring the density of the molten resin. The feedback control system 60 is operated in the plasticizing process, and devised to eliminate the effects of uncertainties, which are found in the conventional system, by minimizing variations in density of the molten resin by the feedback control system 60 before beginning the injection process.

More specifically, in the feedback control system 60, any one of the number of revolutions of the screw, the backing pressure of the screw, and the heating cylinder temperature is controlled by the use of the value detected by the measuring device for measuring the density of the molten resin to minimize variations thereof. Referring now to the motor-driven injection molding machine shown in FIG. 1, the control of the number of revolutions of the screw 20 may be realized by controlling the servomotor 24. The control of the number of revolution of the screw 20 may be realized by controlling the injection servomotor 11. The control of the temperature of the heating cylinder 21 is realized by controlling the heaters 40.

Figure 5:
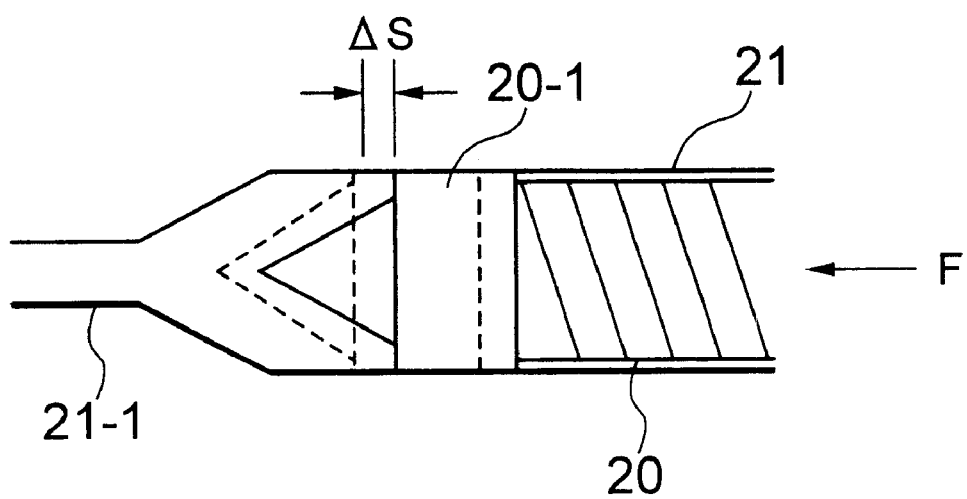
FIG. 5 is an explanatory drawing illustrating the measurement of the density of the molten resin.

The injection molding machine to which this embodiment is applied is predicated on the structure as described below. In other words, the injection molding machine of this embodiment comprises a checking mechanism at the head portion of the screw, and the checking mechanism being closed before injection, wherein measurement of the density of the molten resin may be performed by pressing the screw. To put is briefly, as shown in FIG. 5, the density of the molten resin is detected in such a manner that, upon completion of measuring process, the checking mechanism 20-1 isolates the forward section of the head portion of the screw 20 and the measuring portion in the heating cylinder 21, then the injection servomotor 11 (See FIG. 1) applies a constant force F to the screw 20 to move it forward, and the resultant amount of the forward movement ΔS of the screw 20 is detected, and consequently the density of the molten resin is detected based on the detected forward movement ΔS of the screw 20. The amount of forward movement ΔS of the screw 20 is detected by the position detector (27 in FIG. 1) for detecting the position of the screw 20. The injection molding machine having such a structure is disclosed, for example, in Japanese Unexamined Patent Publication No. 11-34133.

In any cases, after variations in density of the molten resin is minimized in the plasticizing process as described above, the feed forward control is performed as described in conjunction with FIG. 3 in the injecting process. In other words, the injection servomotor 11 controls the injection stroke of the screw 20. As a matter of course, control of the servomotor 24, or control of the temperature of the heating cylinder 21 may be employed instead of control of the injection servomotor 11.

According to the first embodiment, the feed forward control system in which variations in weight of the molded product is zero in theory may be easily designed, thus realizing improved quality of the molded products with no variation in weight thereof.

Figure 6:
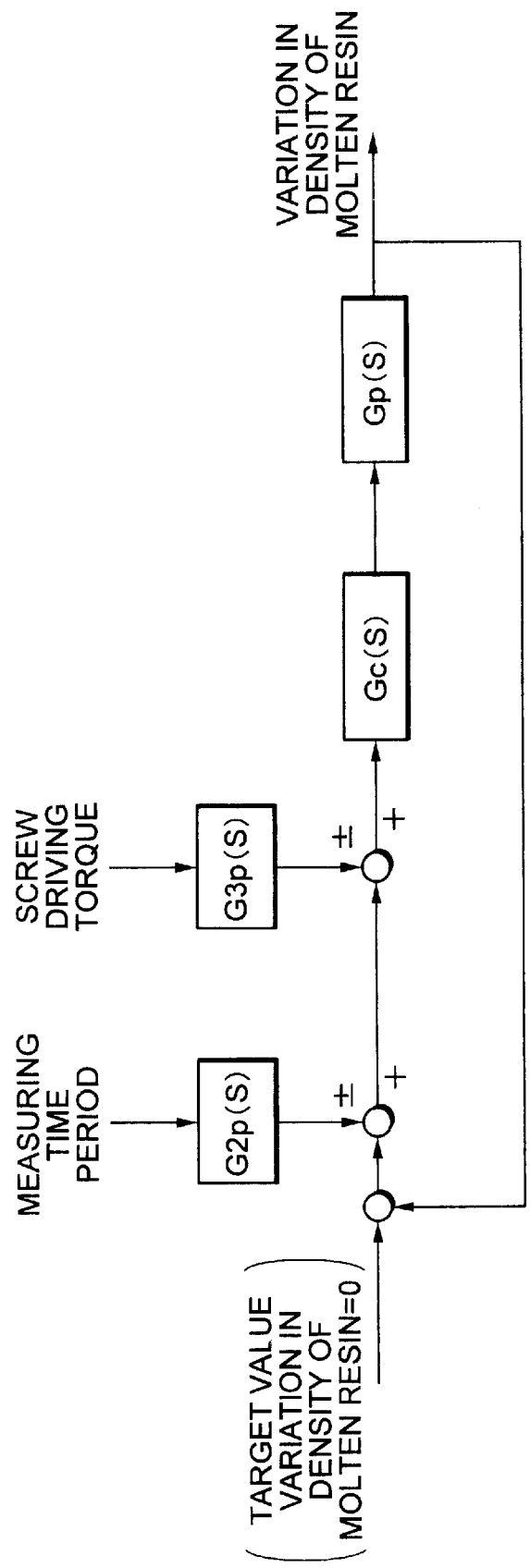
FIG. 6 is a block diagram of a control system according to a second embodiment of the present invention.

Referring now to FIG. 6, a controlling method according to a second embodiment of the present invention will now be described. FIG. 6 is a block diagram showing the control system for implementing the controlling method according to the second embodiment. In FIG. 6, Gc (S) represents a transfer function in the controller, and Gp (S) represents a transfer function of the process. G2p (S) represents a disturbance, which is a transfer function for converting variations in measuring time period into variations in density of the molten resin. G3P (S) represents a transfer function for converting variations in driving torque of the screw into variations in density of the molten resin. The block diagram shows that the feed forward control reduces variations in density of the molten resin that is effected by disturbance, that is, by measuring time period or variations in the driving torque of the screw.

The injection molding machine that is shown in the second embodiment is also predicted on the structure in which the density of the molten resin may be measured by the measuring device for the density of the molten resin as described in conjunction with the first embodiment.

Figure 1:
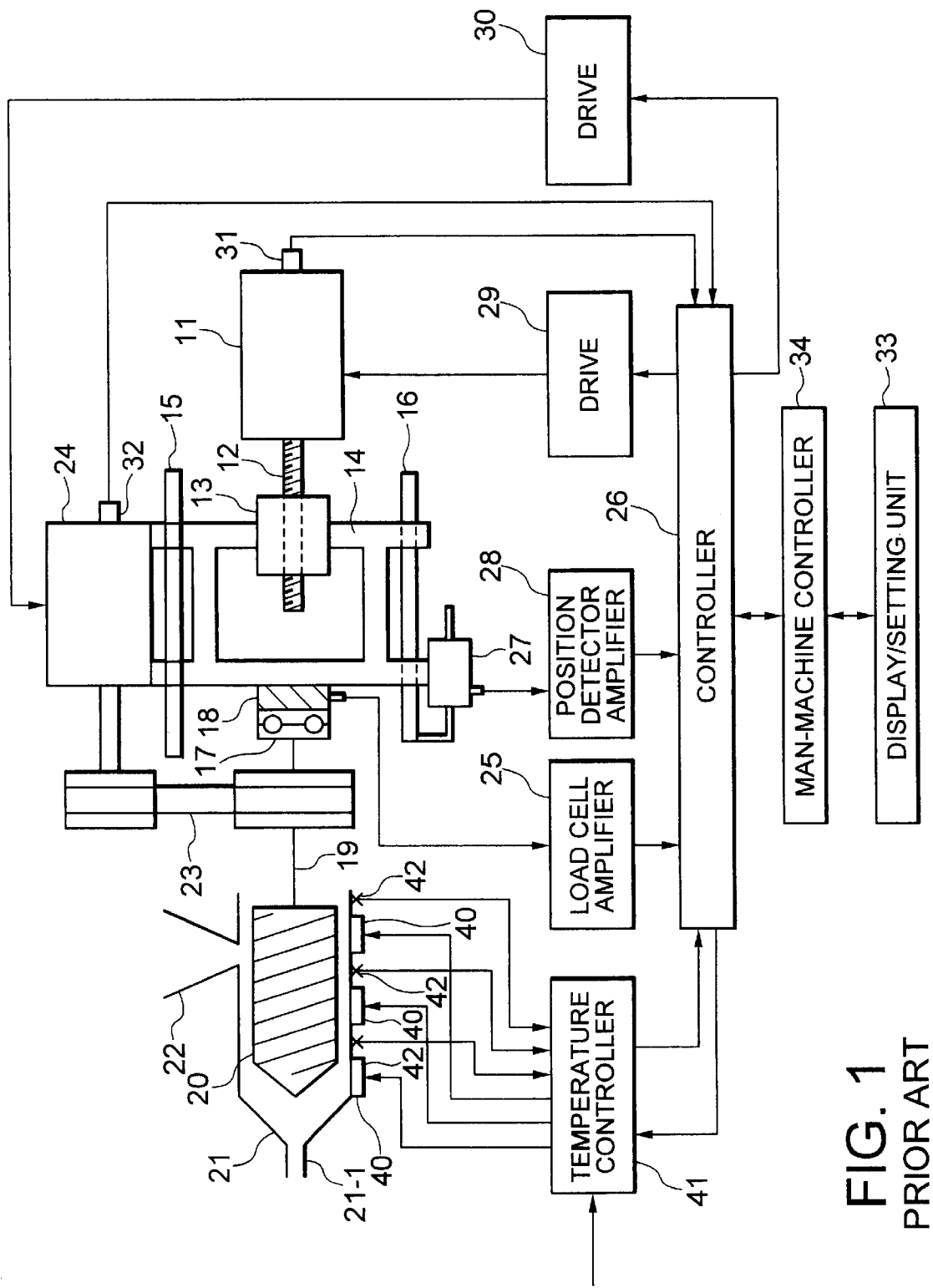
FIG. 1 is an explanatory drawing illustrating one example of a motor-driven injection molding machine.

In this control system, the following algorithm controls the optimal temperature of the heating cylinder 21 that has been described in conjunction with FIG. 1.

(1) As a first step, measurement is carried out for the measuring time period and the driving torque of the screw, in other words the behavior of the driving torque of the injection servomotor 11 to determine the level of the current temperature of the heating cylinder. The measurement of the behavior means to measure the measuring time period or the driving torque of the screw for every shot of the molded product, and to measure the pattern of variations thereof. The measuring time means a period of time to carry out plasticizing/measuring process, and at the same time it is the time during which the screw 20 is rotated by the servomotor 24. The behavior of the driving torque may be measured by detecting the driving current fed to the injection servomotor 11.

a. As regards the measuring time period, in case where the measuring time period increases as the number of the molding cycle increases, the current temperature of the heating cylinder is considered to be low, and on the other hand, when the measuring time period becomes shorter in the same condition, the current temperature of the heating cylinder is considered to be high.

b. As regards the driving torque of the screw, in case where the driving torque reduces as the number of the molding cycle increases, the current temperature of the heating cylinder is considered to be high, and on the other hand, when the driving torque increases in the same condition, the current temperature of the heating cylinder is considered to be low.

c. Variations in density of the molten resin are recognized by variations in a value of minimum cushion. Variations in the value of the minimum cushion are obtained by the equation (position of the screw before injection−position of the minimum cushion=the amount of forward movement of the screw described above). This value is detected as the amount of stroke of the screw by the position detector (27, FIG. 1) for detecting the position of the screw. This detecting method is described more specifically in the publication described above.

Figure 2:
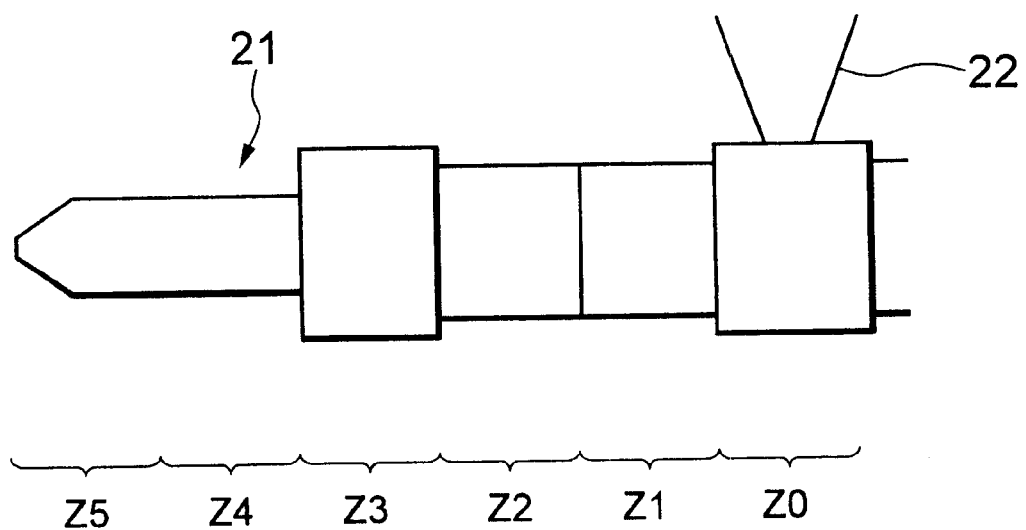
FIG. 2 is an explanatory drawing illustrating a plurality of heaters to be provided around a heated cylinder.

(2) Then the temperature of the heating cylinder is controlled within a certain range based on the algorithm described above, so that variations in density of the molten resin, that is, variations in value of minimum cushion becomes zero. As a matter of course, the temperature control of the heating cylinder 21 is carried out by controlling energization of the heaters 40 located in the zones Z1 and Z2 described in conjunction with FIGS. 1 and 2 by the temperature controller 41 and the controller 26. For example, under the condition that the temperature of the heating cylinder has been determined to be high, when variations in density of the molten resin is large, the heater temperature setting signal for respective heaters 40 located in the zones Z1 and Z2 is fed from the controller 26 to the temperature controller 41 to lower the temperature of the heating cylinder 21.

The second controlling method according to the second embodiment can simplify the design of the feed forward control system, which has been alleged to be difficult.

According to the second embodiment, considering the temperature of the heating cylinder as the amount of operation, the density of the molten resin can be stabilized, thereby presenting the controlling method wherein variations in weight of the molded products may be minimized.

In the first and second embodiments, description has been made based on the premise that the motor-driven injection molding machine is applied, the present invention is also applicable to a hydraulic injection molding machine. In other words, in the hydraulic injection molding machine, an injection cylinder driven by hydraulic pressure is used instead of the rotational motion—linear motion converting mechanism by the use of ball screw and nut as in the injection apparatus shown in FIG. 1. The injection stroke is controlled by controlling hydraulic pressure applied on the injection cylinder.

What is claimed is:

1. A method for controlling an injection molding machine, said method comprising the steps of:
   measuring a density of a molten resin in a heating cylinder;
   controlling a stroke of an injection screw in an injection process by feed forward control based on the measuring step; and
   controlling an operating parameter of the injection molding machine based upon the measuring step.

2. A method as claimed in claim 1, wherein said step of controlling an operating parameter comprises a step of controlling a number of revolutions of the injection screw.

3. A method as recited in claim 1, wherein said step of controlling an operating parameter comprises a step of controlling a backing pressure.

4. A method as recited in claim 1, wherein said step of controlling an operating parameter comprises a step of controlling a temperature of the heating cylinder.

5. A method of controlling an injection molding machine, said method comprising the steps of:

measuring a density of molten resin in a heating cylinder;

determining a state of a temperature of the heating cylinder based upon a predetermined algorithm; and controlling a temperature of the heating cylinder based upon the measuring step and the determined state of the temperature, thereby minimizing variations in density of the molten resin.

6. A method as recited in claim 5, wherein said determining step comprises measuring a measuring time period and a behavior of a driving torque of an injection screw in accordance with the predetermined algorithm, wherein the determining step determines that a current temperature of the heating cylinder is low when the measuring time period increases as a number of molding cycles increases, and that the temperature is high when the measuring time period decreases as the number of molding cycles increases.

7. A method as recited in claim 6, wherein said determining step determines that the current temperature of the heating cylinder is high when the driving torque of the injection screw decreases as the number of molding cycles increases, and determines that the current temperature of the heating cylinder is low when the driving torque of the injection screw increases as the number of molding cycles increases.

8. A method as recited in claim 5, wherein said step of controlling a temperature of the heating cylinder comprises controlling a first heater of a plurality of heaters, said first heater being disposed adjacent a resin feeding hopper on the heating cylinder.

9. A method as recited in claim 8, wherein the determining step determines an amount of forward movement of the injection screw, and wherein the density of the molten resin is determined based upon the determined forward movement.

* * * * *